United States Patent
Gerards

(10) Patent No.: US 9,657,690 B2
(45) Date of Patent: May 23, 2017

(54) FLAP DEVICE FOR AN INTERNAL COMBUSTION ENGINE

(71) Applicant: PIERBURG GMBH, Neuss (DE)

(72) Inventor: Hans Gerards, Gangelt (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 14/770,468

(22) PCT Filed: Dec. 10, 2013

(86) PCT No.: PCT/EP2013/076068
§ 371 (c)(1),
(2) Date: Aug. 26, 2015

(87) PCT Pub. No.: WO2014/131478
PCT Pub. Date: Sep. 4, 2014

(65) Prior Publication Data
US 2016/0003198 A1    Jan. 7, 2016

(30) Foreign Application Priority Data

Feb. 28, 2013  (DE) .................. 10 2013 101 983

(51) Int. Cl.
| | |
|---|---|
| *F02M 26/70* | (2016.01) |
| *F02M 26/72* | (2016.01) |
| *F16K 41/16* | (2006.01) |
| *F02D 9/10* | (2006.01) |
| *F02M 25/07* | (2006.01) |
| *F02D 9/04* | (2006.01) |
| *F16K 1/226* | (2006.01) |
| *F16K 1/22* | (2006.01) |
| *F02M 26/52* | (2016.01) |

(52) U.S. Cl.
CPC ............ *F02M 25/0793* (2013.01); *F02D 9/04* (2013.01); *F02D 9/106* (2013.01); *F02M 26/52* (2016.02); *F02M 26/70* (2016.02); *F02M 26/72* (2016.02); *F16K 1/221* (2013.01); *F16K 1/2268* (2013.01); *F16K 41/16* (2013.01)

(58) Field of Classification Search
CPC ........ F02M 26/70; F02M 26/72; F02M 26/52; F16K 1/221; F16K 41/16; F16K 1/2268; F02D 9/04; F02D 9/106
USPC .............. 251/298, 304–305, 214; 123/188.1, 123/188.6, 190.1
See application file for complete search history.

(56) References Cited

U.S. PATENT DOCUMENTS

| | | | | |
|---|---|---|---|---|
| 5,630,571 | A | * | 5/1997 | Kipp .................... F02D 9/06 251/214 |
| 6,076,831 | A | * | 6/2000 | Pfannenschmidt ... F16K 41/026 251/214 |

* cited by examiner

*Primary Examiner* — Marina Tietjen
(74) *Attorney, Agent, or Firm* — Norman B. Thot

(57) ABSTRACT

A flap device for an internal combustion engine includes a flow housing comprising a flow channel, an actuating shaft, a flap body arranged on the actuating shaft in the flow channel, a housing bore arranged in the flow housing, a lever fixed on the actuating shaft, a bearing bush arranged in the housing bore, and a sealing disk comprising a surface which is at least partially spherically shaped. The housing bore has the actuating shaft protrude outwards therethrough. The lever comprises a rear wall. The bearing bush has the actuating shaft mounted therein. The surface rests under tension against the rear wall of the lever.

12 Claims, 1 Drawing Sheet

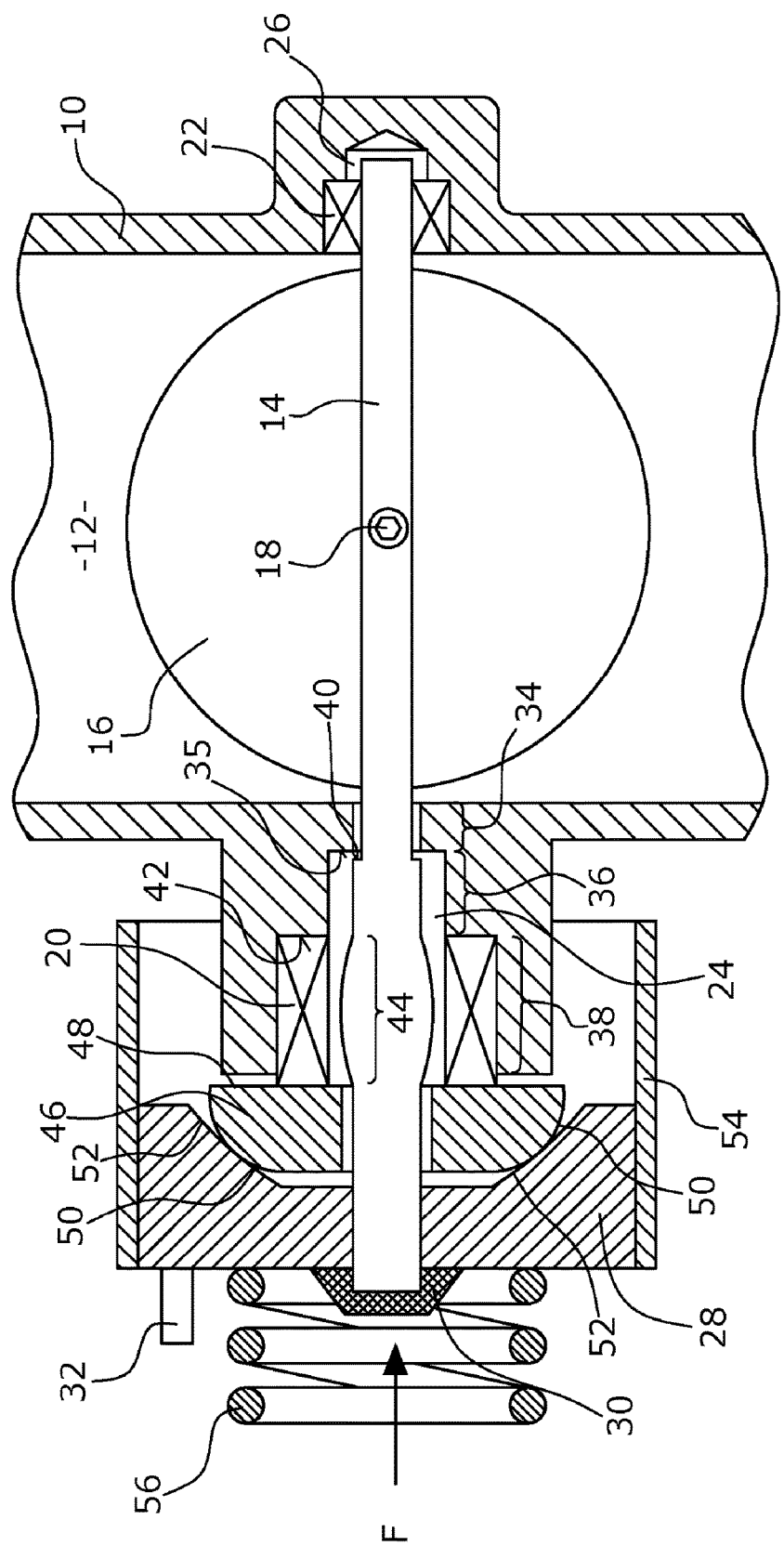

FLAP DEVICE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2013/076068, filed on Dec. 10, 2013 and which claims benefit to German Patent Application No. 10 2013 101 983.8, filed on Feb. 28, 2013. The International Application was published in German on Sep. 4, 2014 as WO 2014/131478 A1 under PCT Article 21(2).

FIELD

The present invention relates to a flap device for an internal combustion engine, having a flow housing in which a flow channel is formed, an actuating shaft, a flap body arranged on the actuating shaft in the flow channel, a housing bore in the flow housing through which housing bore the actuating shaft protrudes outward, a lever fastened to the actuating shaft, a bearing bush which is fastened to the actuating shaft and in which the actuating shaft is supported, and a sealing disc with an at least partly spherically shaped surface.

BACKGROUND

Such flap devices serve, for example, as exhaust gas retention flaps or exhaust gas recirculation flaps in the exhaust system of an internal combustion engine. Exhaust gas contains pollutants that must be prevented from escaping to the outside so that a reliable sealing must be ensured along the shaft which extends outward towards an actuator. This sealing must function perfectly at all times under varying thermal loads. A very precise controllability must also be observed with the flaps in order to meet pollution emission standards for modern internal combustion engines. It has been found, however, that damage at the bearing site is caused even more often by ingress from outside. This leads to corrosion in the area of the bearing, caused by the introduction of dirt or by the introduction of salt and humidity.

Various flap devices have previously been described which have attempted to ensure a sufficient sealing. WO 2006/003017 A1, for example, describes a flap valve for an exhaust system of a motor vehicle, wherein a bearing bush, as well as a spring element, a sealing disc, and a bearing ring, are arranged in a bearing housing fastened to the flow housing. The shaft protrudes out from the bearing housing which has a conical restriction at its end facing away from the flow housing and surrounding the opening through which the shaft protrudes, the spring force pressing the correspondingly conical surface of the bearing ring against the restriction with interposition of the sealing disc. The contact area of the conical surfaces serves as a sliding and sealing surface between the bearing housing and the bearing ring. An escape from the bearing region along the shaft is intended to be achieved by placing the sealing disc in a manner free of play.

An exhaust gas flap is also described in U.S. Pat. No. 5,630,571, the exhaust gas flap comprising a bearing housing in which a bearing bush and a spherical sealing disc are arranged, which disc is in contact with a negative spherically shaped ceramic disc. The end of the shaft protruding from the bearing housing is provided with a lever against the rear side of which a wave spring rests, the opposite side thereof being in contact with a bush which is, in turn, in contact with the ceramic disc. The sealing disc pressed on the shaft is urged against the stationary ceramic disc by the wave spring. The outer bush is, however, thereby subjected to exposure to spray water in the internal combustion engine.

The components in each of these two above-described exhaust gas flap sealing systems must be manufactured with an extremely high precision in order to provide sufficient sealing since the correspondingly shaped surfaces would otherwise have no sealing effect. An ingress of corrosive substances into the bearing region from outside cannot therefore be prevented in a reliable manner. A great number of components is moreover required, which results in an increased assembly effort.

SUMMARY

An aspect of the present invention is to provide a flap device for an internal combustion engine, wherein a safe sealing to the outside is obtained independent of the the thermal load and thermal expansion resulting therefrom, and where an ingress of corrosive substances from outside is prevented. A further aspect of the present invention is that the sealing be manufactured as economically as possible so that narrow manufacturing tolerances can be omitted and a simple assembly provided.

In an embodiment, the present invention provides a flap device for an internal combustion engine which includes a flow housing comprising a flow channel, an actuating shaft, a flap body arranged on the actuating shaft in the flow channel, a housing bore arranged in the flow housing, a lever fixed on the actuating shaft, a bearing bush arranged in the housing bore, and a sealing disk comprising a surface which is configured to be at least partially spherically shaped. The housing bore is configured to have the actuating shaft protrude outwards therethrough. The lever comprises a rear wall. The bearing bush is configured to have the actuating shaft be mounted therein. The surface is configured to rest under tension against the rear wall of the lever. Due to the at least partly spherically shaped surface which rests under tension against a rear wall of the lever, the number of components is reduced and assembly is thereby facilitated. The lever is for the first time also used as a part of the sealing by preventing a flow along the shaft.

BRIEF DESCRIPTION OF THE DRAWINGS

The present invention is described in greater detail below on the basis of embodiments and of the drawings in which:

FIG. 1 shows a side elevational view of a flap device of the present invention in section.

DETAILED DESCRIPTION

In an embodiment of the present invention, the surface of the sealing disc can, for example, be formed with a positive spherical shape and the rear wall of the lever can, for example, be formed at least partly with a negative spherical or conical shape, the radius of curvature of the surface being smaller than the radius of curvature of the lever rear wall. In an alternative embodiment of the present invention, the lever rear wall can, for example, be formed at least partly with a positive spherical shape and the surface of the sealing disc can, for example, be formed with a negative spherical shape, the radius of curvature of the surface being greater than the radius of curvature of the lever rear wall. Both embodiments provide a linear contact between the lever and the sealing disc which is obtained even when errors in parallelism exist. An ingress of gases or liquids into the bearing region through the gap between the lever and the sealing disc is thereby reliably prevented.

It should be pointed out that throughout the present application, a positive spherical shape of a body refers to a body with a partly spherical surface whose radius of curvature extends through the body, and that a negative spherical shape of a body refers to a body with a partly hollow-spherical shape whose radius of curvature is directed to the side opposite the body.

The sealing disc may advantageously be arranged to be movable with respect to the actuating shaft and to surround the actuating shaft radially so that a tilting of the sealing disc relative to the shaft is possible. This leads to a secure sealing and a simultaneous insensitivity in the event of occurring thermal expansions.

In an embodiment of the present invention, a spring can, for example, load the lever with the actuating shaft towards the channel. The required tension for generating the pressing force between the lever and the sealing disc is thus generated in a simple manner.

In an embodiment of the present invention, the plane surface of the sealing disc axially opposite the spherically curved surface can, for example, rest on the bearing bush in a planar and tensioned manner. A sealing between the bearing bush and the sealing disc is thus also formed without having to use additional components.

In an embodiment of the present invention, the bearing bush can, for example, be a carbon bearing bush that is insensitive to thermal and corrosive loads caused by the exhaust gas.

In order to provide the tensioning of the entire bearing and sealing unit, the axial end of the bearing bush opposite the sealing disc rests on a stop of the housing bore. The entire unit is thus pressed against this stop by the spring and is tensioned thereby.

In an embodiment of the present invention, the actuating shaft can, for example, be formed in a convex shape in the region situated radially inward with respect to the bearing bush. A secure bearing without the occurrence of inner tensions is thus also provided if misalignments exist between the bearing bush and the actuating shaft.

In an embodiment of the present invention, the actuating shaft and the housing bore can, for example, each comprise at least one shoulder between the channel and the bearing bush. These shoulders act as a labyrinth seal and increase the flow resistance along the shaft so that an ingress of exhaust gas into the bearing becomes significantly more difficult.

In order to prevent an ingress of liquid or salt along the shaft from outside, the lever is connected with the actuating shaft in a material circumferential or a form-fitting tight manner. This connection is tight and has a long useful life.

It can further be advantageous if the lever has a sleeve arranged thereon which extends in the direction of the flow channel. The region of the housing that accommodates the bearing is thus additionally shielded from the outside so that a direct contact, for example, with spray water, is avoided.

A flap device for an internal combustion engine is thus provided which is sufficiently tight both to the outside and to the inside even under varying thermal conditions because component and assembly tolerances, as well as thermal expansions, and errors in alignment and parallelism, are compensated for in the present structure by the flexibility of the sealing disc position without limiting the sealing effect. The assembly of this sealing and bearing as well as the manufacture of the components is simple so that costs are significantly reduced. This bearing and sealing still have a long useful life.

An embodiment of a flap device of the present invention is illustrated in the drawing and will be described hereunder.

The flap device of the present invention comprises a flow housing 10 in which a flow channel 12 is formed through which, for example, exhaust gas flows.

The flow channel 12 is divided in cross section into two halves by an actuating shaft 14 on which a flap body 16 is fastened by means of a screw 18, with a material connection also being possible. The actuating shaft 14 is supported in the flow housing 10 by two bearing bushes 20, 22, wherein the first bearing bush 20 is arranged in a continuous housing bore 24 through which the actuating shaft 14 extends outward from the flow housing 10, and the second bearing bush 22 is arranged on the side opposite the continuous housing bore 24 in a blind hole 26 formed in the flow housing 10. The actuating shaft 14 is correspondingly supported on two sides of the flow housing 14 opposite to each other with respect to the center axis.

On the end of the actuating shaft 14 protruding outward, a disc serving as a lever 28 is fastened by a material connection in the form of a circumferential weld joint 30 at the radial end portion of which a pin 32 is fastened via which the actuating shaft 14 can be connected with an actuator through a linkage (not illustrated herein), which actuator may be designed in particular as an electric motor. By virtue of the circumferential weld joint 30, no gas or liquid can flow between the actuating shaft 14 and the lever 28.

The continuous housing bore 24 is of a step-shaped design and accordingly has three sections 34, 36, 38 with diameters becoming larger towards the outer side. The first section 34 with the smallest diameter defines the flow channel 12 and is slightly larger than the diameter of the actuating shaft 14. Behind the first section 34, as seen from the flow channel 12, not only the continuous housing bore 24 has a shoulder 35, but also the actuating shaft 14 has shoulder 40, so that the actuating shaft 14 extends further outward with a larger diameter. This portion of the actuating shaft 14 is arranged radially in the second section 36 of the continuous housing bore 24. The first shoulder 35 and the second shoulder 40 together form a labyrinth seal that hinders the ingress of exhaust gas in the direction of the first bearing bush 20.

A shoulder of the continuous housing bore 24 is formed between the second section 36 and the third section 38 that serves as a stop 42. The first bearing bush 20 designed as a carbon bearing rests on this stop 42 in the axial direction. The first bearing bush 20 is fastened by press-fitting in the third section 38 of the continuous housing bore 24 and surrounds and supports the actuating shaft 14 which is of a convex shape in the portion 44 situated radially inward with respect to the first bearing bush 20. The opposite axial end of the first bearing bush 20 extends slightly beyond this bearing portion of the flow housing 10 in the axial direction and rests on a sealing disc 46 radially surrounding the actuating shaft 14 with a slight distance therebetween, wherein the face 48 of the sealing disc 46 that faces the first bearing bush 20 is of a planar design.

According to the present invention, an axially opposite surface of the sealing disc 46 has a spherically curved surface 50 in its radially outer region. This spherically shaped surface 50 rests directly on a rear wall 52 of the lever 28. To provide a reliable sealing between the rear wall 52 of the lever 28 and the sealing disc 46, the rear wall 52 also has a curvature, although a negative spherical curvature, which in the present application always means that the center of the radius of the sphere is arranged on a side of the curved surface opposite to the lever 28. The radius of curvature of this spherically shaped region of the rear wall 52 should be chosen to be larger than the radius of curvature of the sealing disc 42 in the corresponding region. An annular linear contact thereby always exists between the rear wall 52 of the lever 28 and the sealing disc 46.

At its outer circumference, the lever 28 has a sleeve 54 extending toward the flow housing 10 that at least partly surrounds the first bearing portion 20 of the flow housing 10 in the radial direction.

FIG. 1 further shows a schematically illustrated spring 56 which exerts a spring force on the lever 28 in the direction towards the flow channel 12. The illustration of the spring 56 is schematical since the force application point of the spring 56 and the design and arrangement of the spring 56 are variable to a large extent. It is, for example, conceivable that spring 56 can be designed as a compression spring or as a tension spring. It may at the same time also serve as a return spring and act on the lever 28, for example, via sleeve 54.

It is essential to the present invention that a force be generated on the actuating shaft 14 or the lever 28 firmly connected therewith, the force acting in the direction of the second bearing bush 22 or in the direction of the flow channel 12. By this force, which in the shown embodiment is exerted by the spring 56, the rear wall 52 of the lever 28 with its negative spherical surface is pressed against the spherically shaped surface 50 of the sealing disc. The sealing disc 46 is at the same time pressed with its face 48 against the first axial end of the first bearing bush 20 and at the same is in turn pressed against stop 42. Since the actuating shaft 14 can be tilted slightly in the first bearing bus 20, and thereby the lever 28 can also be tilted slightly with respect to the axis, and since the sealing disc 46 is arranged to be movable relative to the actuating shaft 14 and to surround the actuating shaft 14, the face 48 of the sealing disc 46 always rests on the first bearing bush 20 in a planar manner and is in linear circumferential contact with the rear wall 52 of the lever 28 even if slight errors of alignment and parallelism exist. It is thereby achieved that no dirty water, salt, or other contaminants can reach the bearing surface of the first bearing bush 20 from the outside since no gaps are present, be it along the actuating shaft 14 or on the radial outer side. No exhaust gas can further escape to the outside from the flow channel 12 since the circumferential weld joint 30 provides for a sealing along the actuating shaft 14 to the lever 28 and a radial escape of exhaust gas is avoided by the two sealing surfaces, face 48 and spherically shaped surface 50, of the sealing disc 46. When the actuating shaft 14 is rotated with the lever 28 via the actuator, a relative movement between the first bearing bush 20 and the sealing disc 26 is obtained, which, due to the large planar contact surface, can, however, slide thereon without much wear and with the sealing effect remaining unchanged.

If component and assembly tolerances not taken into account occur during operation or if, for example, due to varying thermal loads, thermal expansion or wear caused by use occur, an ever sufficient sealing is thereby provided in both directions since the position of the sealing disc 46 and the position of the actuating shaft 14 will adapt in a corresponding manner. The ingress of dirt from the outside is hindered by the sleeve which prevents a direct contact with dirty water. The flap device and its sealing have a long service life due to low wear and are simple to mount because of the low number of components.

It should be clear that the scope of protection is not restricted to the flap device described, but that various modifications and structural changes are conceivable. The press force can in particular be applied in different ways. The connection between the shaft and the lever can also be realized in different ways. The two spherical surfaces of the lever and the sealing disc may also each be curved in the opposite direction. Reference should be had to the appended claims.

What is claimed is:

1. A flap device for an internal combustion engine, the flap device comprising:
    a flow housing comprising a flow channel;
    an actuating shaft;
    a flap body arranged on the actuating shaft in the flow channel;
    a housing bore arranged in the flow housing, the housing bore being configured to have the actuating shaft protrude outwards therethrough;
    a lever fixed on the actuating shaft, the lever comprising a rear wall;
    a bearing bush arranged in the housing bore, the bearing bush being configured to have the actuating shaft be mounted therein; and
    a sealing disk comprising a surface which is configured to be at least partially spherically shaped, the surface being configured to rest under tension against the rear wall of the lever.

2. The flap device as recited in claim 1, wherein,
    the surface is formed with a positive spherical shape,
    the rear wall is formed at least partly with a negative spherical shape or a conical shape, and
    a radius of curvature of the surface is smaller than a radius of curvature of the rear wall.

3. The flap device as recited in claim 1, wherein,
    the rear wall is formed at least partly with a positive spherical shape,
    the surface is formed with a negative spherical shape, and
    a radius of curvature of the surface is larger than a radius of curvature of the rear wall.

4. The flap device as recited in claim 1, wherein the sealing disc is arranged to be movable with respect to the actuating shaft and to radially surround the actuating shaft.

5. The flap device as recited in claim 1, further comprising:
    a spring,
    wherein, the spring is configured to tension the lever with the actuating shaft in a direction of the flow channel.

6. The flap device as recited in claim 1, wherein the sealing disc further comprises a plane surface arranged axially opposite to the at least partially spherically shaped surface, the plane surface being configured to rest on the bearing bush in a tensioned manner and in a planar manner.

7. The flap device as recited in claim 1, wherein the bearing bush is a carbon bearing bush.

8. The flap device as recited in claim 1, wherein,
    the housing bore comprises a stop, and
    the bearing bush comprises an axial end arranged opposite of the sealing disc, the axial end being arranged to rest on the stop.

9. The flap device as recited in claim 1, wherein the actuating shaft comprises a convex shape in a region arranged opposite to the bearing bush.

10. The flap device as recited in claim 1, wherein,
    the housing bore comprises at least one first shoulder arranged between the flow channel and the bearing bush, and the actuating shaft comprises at least one second shoulder arranged between the flow channel and the bearing bush.

11. The flap device as recited in claim 1, wherein the lever is connected with the actuating shaft in a materially bonded manner or in a form-fitting and tight manner.

12. The flap device as recited in claim 1, wherein the lever further comprises a sleeve arranged thereon which extends in a direction of the flow channel.

\* \* \* \* \*